United States Patent [19]
Singleton

[11] 3,768,834
[45] Oct. 30, 1973

[54] COUPLER FOR INTERCONNECTING TWO BICYCLES

[76] Inventor: James Singleton, 113-21 202nd St., St. Albans, N.Y.

[22] Filed: June 8, 1972

[21] Appl. No.: 261,067

[52] U.S. Cl. .............................................. 280/209
[51] Int. Cl. ............................................ B62k 13/06
[58] Field of Search .................. 280/209, 7.16, 231, 280/222, 202; 297/248

[56] References Cited
UNITED STATES PATENTS

| | | | |
|---|---|---|---|
| 616,407 | 12/1898 | Cottrell et al. | 280/209 |
| 636,155 | 10/1899 | Mackay | 280/209 |
| 639,943 | 12/1899 | Schleicher | 280/209 |
| 1,522,039 | 1/1925 | Swearinger | 280/209 |
| 3,516,686 | 6/1970 | Stalder | 280/209 |

FOREIGN PATENTS OR APPLICATIONS

| | | | |
|---|---|---|---|
| 9,078 | 10/1899 | Great Britain | 280/209 |
| 12,783 | 4/1905 | Great Britain | 280/209 |
| 188,345 | 3/1924 | Great Britain | 280/209 |

*Primary Examiner*—Allen N. Knowles
*Assistant Examiner*—Gene A. Church
*Attorney*—George Gottlieb et al.

[57] ABSTRACT

There is disclosed a coupler for interconnecting two bicycles. The coupler includes a main support member having a vertical frame and eight telescoping crossbars, four on each side of the vertical frame, the ends of which can be attached to two side-by-side bicycles. A seat, for carrying a child, for example, is provided on top of the central frame member. A toggle mechanism is also provided for attachment to the front wheel supports to insure that the front wheels turn together and are aligned at all times. The widths of the main support member and the toggle mechanism can be adjusted so that the separation between the two bicycle riders can be set as desired.

6 Claims, 8 Drawing Figures

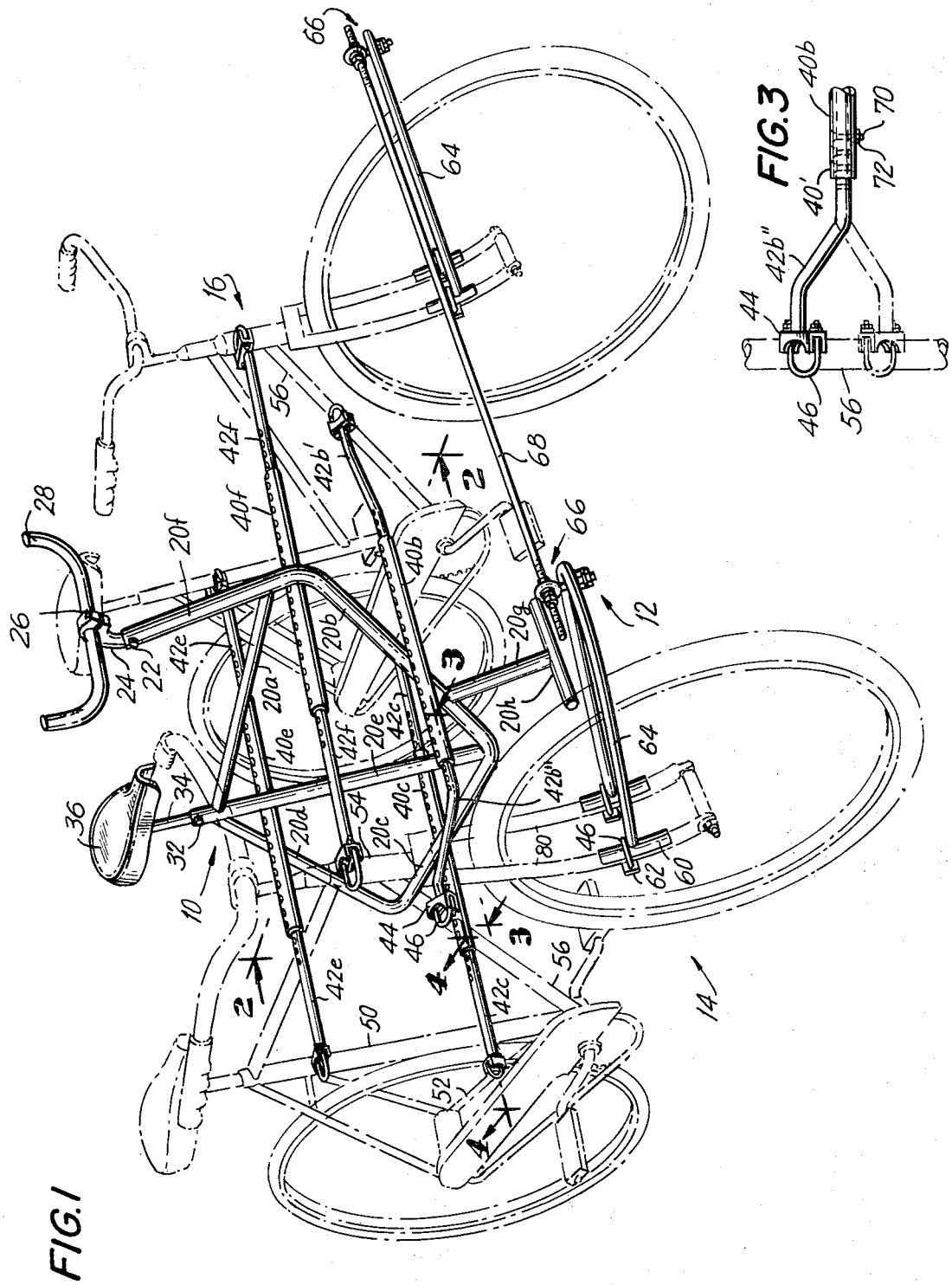

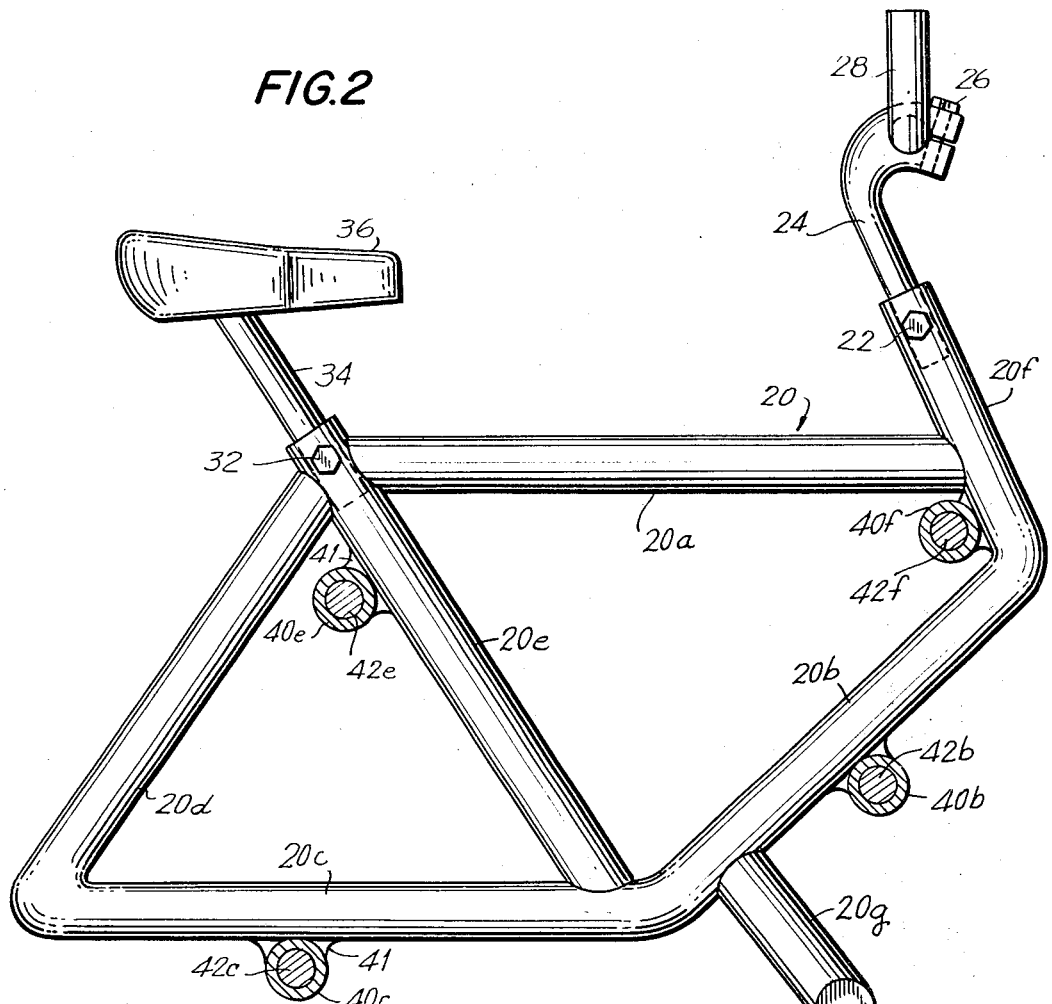
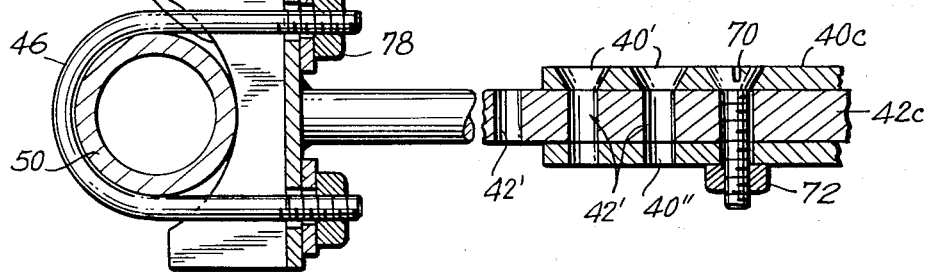
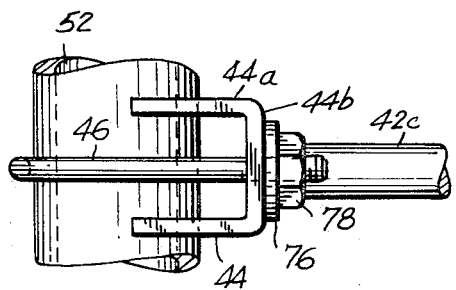

Patented Oct. 30, 1973 3,768,834

COUPLER FOR INTERCONNECTING TWO BICYCLES

This invention relates to bicycles, and more particularly to couplers for interconnecting a pair of bicycles in side-by-side relationship.

over the course of many decades there have been proposals for providing couplers for interconnecting two bicycles. Such a coupler secures to each other two side-by-side bicycles, thereby providing a stable structure on which two persons can ride. For example, an experienced rider may ride on one of the bicycles while instructing an inexperienced rider on the other. The coupler eliminates any need for balancing by the riders. Also, such an arrangement permits a husband and wife, for example, to ride on bicycles together, with a child supported in a seat attached to the coupler between them.

There are several requirements which should be satisfied by any such coupler for it to have widespread appeal. First, it is important that the two front wheels turn with each other so that the two riders cannot steer in different directions. Second, it should be possible to attach the coupler to the two bicycles with a minimum of effort, and to detach it just as simply. It is also important that there be a minimum number of disconnected parts so that to attach the coupler does not appear to be too formidable a task to the ordinary bicycle rider. Lastly, it is highly desirable that the separation between the two bicycles be adjustable. For example, if a child is not being carried, it should be possible to decrease the separation between the two bicycles so that the two riders may ride closer together.

It is a general object of my invention to provide a coupler for interconnecting two bicycles which has all of the aforesaid desirable characteristics.

Briefly, in accordance with the principles of my invention, I provide a central vertical frame having eight telescoping crossbars which are perpendicular to the plane of the frame with four crossbars being on each side of the central frame. The free end of each crossbar can be connected to a particular structural part of one of the bicycles. A seat is carried above the central frame. The telescoping crossbars permit adjustment of the separation between the two bicycles — depending upon whether a child is to be carried. The fact that the eight crossbars are secured to a central frame greatly reduces the apparent complexity of the device; in effect, only a single structural member must be worked with to provide the basic support for the two bicycles. The only additional element required is a toggle mechanism which interconnects the two front wheel supports in order to prevent their turning in different directions.

Further objects, features and advantages of my invention will become apparent upon consideration of the following detailed description in conjunction with the drawing, in which:

FIG. 1 is a perspective view of the coupler of my invention, and illustrates the coupler attached to two bicycles (the two bicycles being shown in phantom);

FIG. 2 is a side view of the coupler taken along the line 2—2 of FIG. 1;

FIG. 3 is a side view of a portion of the coupler taken along the line 3—3 of FIG. 1, and further illustrates (in phantom) an alternate position of member 42b'';

FIG. 4 is a sectional view taken through the line 4—4 of FIG. 1, and shows how the free end of a crossbar is secured to a structural part of a bicycle;

FIG. 5 is a side view taken along the line 5—5 of FIG. 4;

Figure 6:
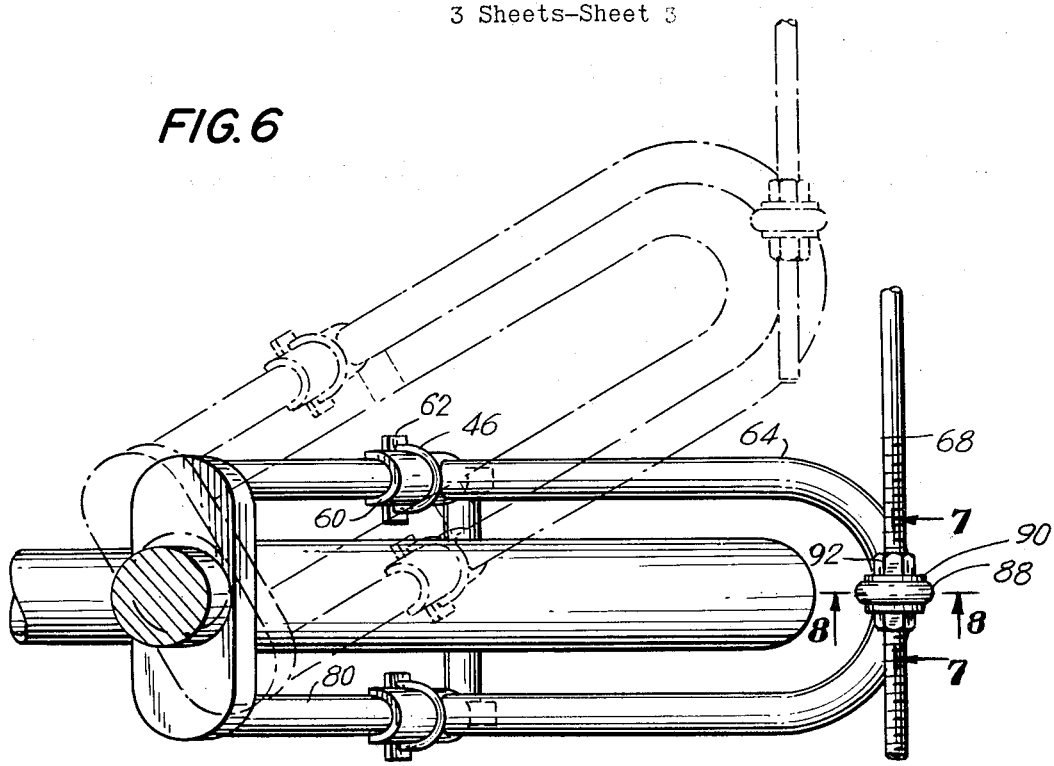
FIG. 6 is a view looking down from above one of the front bicycle wheels and illustrates the toggle mechanism attached thereto.

Referring to FIGS. 1 and 2, the main support member 10 consists of a central vertical frame 20 having seven struts 20a–20g. Four cylindrical crossmembers 40b, 40c, 40e and 40f, each having a bore therein, are welded to respective struts, as shown by the numerals 41. Within each of the cylindrical crossmembers there are two telescoping crossbars such as the two crossbars 42c which extend out of crossmember 40c on opposite sides of central frame 20. It is the free end of each telescoping crossbar which is external to the respective cylindrical crossmember that is secured to a particular structural part of respective bicycle as shown in FIG. 1.

Strut 20g serves simply to support a horizontal bar 20h (FIG. 1) which serves as a foot rest for a child, for example, who is placed on seat 36. The seat is supported by a telescoping bar 34 which slides within strut 20e and is held in a desired position by the tightening of nut 32. The adjustment of seat 36 is similar to the adjustment of a conventional seat on a bicycle. Similarly, a telescoping handle support 24 is provided for sliding within strut 20f, and a nut 22 is provided to secure handle support 24 in any desired position. Handlebars 28 are provided, together with a locking nut 26 of conventional design, so that handlebars are provided for a child who is being carried along by the two bicycle riders.

FIG. 4 illustrates the manner in which the position of each telescoping crossbar can be adjusted within its respective cylindrical crossmember. Cylindrical crossmember 40c, as shown in FIG. 4, is provided with a series of screwhead cut-outs 40' from one of its ends to the other, with an aligned hole 40'' being provided in the crossmember opposite each screwhead cut-out. Telescoping crossbar 42c is provided with a series of diametrical holes 42'. The position of the crossbar is adjusted within the cylindrical crossmember until the desired telescoping position of the crossbar is achieved, at which time a screw 70 is passed through the two elements as shown in FIG. 4 to secure them in position. A nut 72 is provided to maintain the screw in place. Eight such screws are required to lock the eight telescoping crossbars in position.

The free end of each telescoping crossbar terminates in a U-shaped binding block 44, shown most clearly in FIGS. 4 and 5. Each binding block has two side sections 44a and a bridging section 44b. The end of each side section which is farthest away from the connected crossbar is curved, as shown by the numeral 44' in FIG. 4, so that it forms a seat for a structural part of that one of the two bicycles to which it is to be connected. Such a bicycle part, having a circular cross-section, is shown by the numeral 52 in FIG. 4. A U-bolt 46 is provided for encircling the bicycle part, the two threaded ends of the U-bolt extending through two holes in section 44b of the binding block. A washer 76 is placed around each threaded end of the U-bolt, and a nut 78 is then tightened on each end of the U-bolt to secure the bicycle part against the binding block.

FIG. 1 illustrates coupler 10 attached to two bicycles 14 and 16. Each telescoping crossbar 42e is secured to seat post 50 of a respective bicycle, each crossbar 42c is secured to a rear wheel bicycle part 52 of a respective bicycle, each telescoping crossbar 42b is secured to a diagonal bicycle part 56 of a respective bicycle, and each crossbar 42f is secured to the steering post 54 of a respective bicycle.

Telescoping crossbars 42e are curved slightly at their free outer ends, as shown in FIG. 1. The diagonal bicycle parts 56 on girl's and boy's bicycles are generally in different positions. To allow the same crossmember 40b to support the two telescoping crossbars 42b whose free ends may have to be secured to the two bicycles in out-of-line positions, the two crossbars are bent slightly. Crossbar 42b' is shown with its free end forward of crossmember 40b, while crossbar 42b'' is shown with its free end rearward of the crossmember. Referring to FIG. 4, it will be apparent that a telescoping crossbar can be secured within a cylindrical crossmember by a screw 70 in either one of two positions, as long as the holes 42' in the crossbar are aligned with the screwhole cut-outs in the crossmember. Since the two crossbars 42b are curved at their free ends, it is apparent that by rotating one of them 180° relative to the other, the respective binding blocks may be forward and rearward of the same crossmember 40b. (It is also possible to provide two or more intersecting holes 42' at several axial positions in each crossbar to provide four or more orientations for each of telescoping crossbars 42b.) FIG. 3 illustrates the position of telescoping crossbar 42b'' as it is shown in FIG. 1, with the same element being shown in phantom as it would appear were it rotated 180°. While the free ends of each of the other three pairs of crossbars are shown in line with each other in FIG. 1, it is to be understood that the crossbars can be bent slightly without permanently distorting them in order to link together two bicycles whose structural parts are not identically oriented.

The front wheel of each bicycle is supported by two conventional wheel supports 80. These supports, as is known in the art, are coupled along the steering column to the handlebars. Toggle mechanism 12 of FIG. 1 serves to tie the wheel supports on the two bicycles to each other such that the two wheels turn in the same direction at all times. Toward this end, a U-shaped member 64 (see FIG. 6) is secured to the two wheel supports 80 on each bicycle. Each of the free ends of a U-shaped member 64 is provided with a clamping plate 60 around and secured to which there is provided U-bolt 46. Each clamping plate 60 is placed against one of the wheel supports 80 so that the respective U-bolt extends around and past the wheel support. A flat plate 62 is provided for each clamping plate 60. The flat plate has two holes so that the two ends of the U-bolt 46 can be passed through it. The two ends of each U-bolt are then secured by nuts so that each of members 64 is secured to a pair of wheel supports 80. (The nuts for securing each of U-bolts 46 to one of flat plates 62 are not shown in the drawing.)

Figure 7:
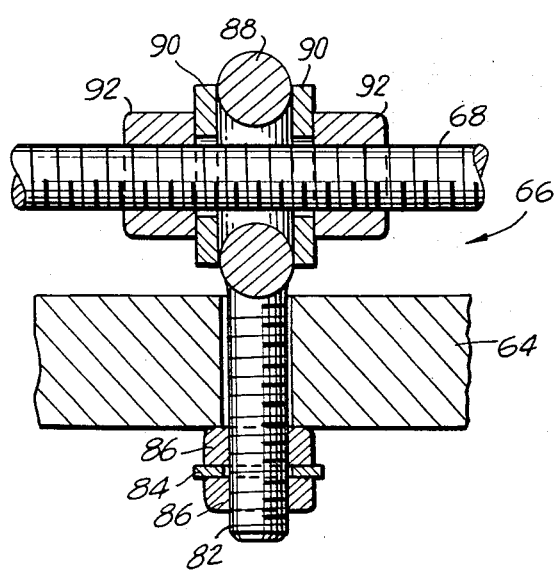
FIG. 7 is a view taken through the line 7—7 of FIG. 6.
Figure 8:
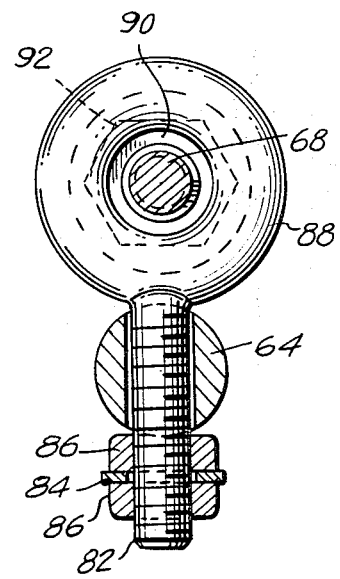
FIG. 8 is a sectional view taken through the line 8—8 of FIG. 6.

Extending upward from the curved section of each of U-shaped members 64, as seen most clearly in FIG. 7, is a shank 82 which passes through a hole in member 64. At the top of the shank there is a vertical ring 88 formed as an integral part of the shank. After the shank is passed through member 64, it is secured by two nuts 86 and a lockwasher 84. The shank can rotate within the hole of member 64.

An elongated screw-threaded rod 68 is passed through the ring on top of each shank 82. A pair of washers 90 and two nuts 92 are provided for each ring 88, as shown most clearly in FIG. 7, for securing rod 68 within the ring. The axial position of the rod within each ring can be adjusted by turning the nuts 92 around the rod, but after a desired position is achieved, and the nuts are tightened, the rod is held fixed within the ring. However, the rod and each ring 88 can rotate around the axis of the respective shank 82 due to the clearance between the shank and the hole in member 64 through which it is passed. The toggle mechanism 12 serves to align the two wheels with each other so that at all times both bicycles are steered in the same direction. The reason for providing adjusting nuts 92 is that the length of rod 68 between the two wheels may have to be adjusted if the separation between the two bicycles is changed as the telescoping crossbars in the main support member 10 are pushed into or pulled out of respective cylindrical crossmembers.

It is thus apparent that I have provided a two-element coupler for interconnecting two bicycles — a main support member for securing the two bicycles to each other, and a toggle mechanism for insuring that the two front wheels are always aligned with each other. The coupler is easily attached to or removed from the two bicycles, and its width can be adjusted in accordance with the desires of the riders. Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What I claim is:

1. A coupler for interconnecting two bicycles, each bicycle having a plurality of interconnected structural parts and a rotatable front wheel supported by two wheel supports, comprising a central vertical frame, a plurality of crossmembers having bores therein secured to said frame and extending outward from both sides thereof, a pair of telescoping crossbars movable within each of said crossmembers, means for locking each telescoping crossbar in a desired position within its respective crossmember, means at the free end of each of said crossbars for securing it to a structural part of a respective one of the two bicycles, and an adjustable-width toggle mechanism for attachment to wheel supports of both of said bicycles for maintaining the front wheels of said bicycles in alignment.

2. A coupler for interconnecting two bicycles in accordance with claim 1 wherein at least one telescoping corssbar on each side of said central vertical frame is curved in a region which is exterior of the respective crossmember.

3. A coupler for interconnecting two bicycles in accordance with claim 1 wherein said central vertical frame includes a seat for supporting a rider thereon.

4. A coupler for interconnecting two bicycles in accordance with claim 1 wherein said crossbars and said crossmembers include diametrical holes therethrough, and said locking means include means for insertion through aligned holes in said crossbars and said crossmembers and means for securing said insertion means therein.

5. A coupler for interconnecting two bicycles in accordance with claim 1 wherein said means at the free end of each of said crossbars includes a binding block and releasable U-bolt means for encircling a respective structural part of a bicycle.

6. A coupler for interconnecting two bicycles in accordance with claim 1 wherein said toggle mechanism includes a pair of means each for attachment to the wheel supports of one of said bicycles, a rod threaded at each end thereof, and a pair of means each adjustably securable to a respective threaded portion of the rod and having a shank fitted and for rotation in a respective one of said attachment means.

* * * * *